(12) United States Patent
Uchiyama et al.

(10) Patent No.: US 7,483,644 B2
(45) Date of Patent: Jan. 27, 2009

(54) IMAGE FORMING APPARATUS AND HIGH VOLTAGE POWER THEREOF

(75) Inventors: Takehiro Uchiyama, Shizuoka-Ken (JP); Takeshi Kawamura, Shizuoka-Ken (JP); Tomohiro Nakamori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 444 days.

(21) Appl. No.: 11/248,152

(22) Filed: Oct. 13, 2005

(65) Prior Publication Data

US 2006/0091916 A1 May 4, 2006

(30) Foreign Application Priority Data

Oct. 29, 2004 (JP) ............................. 2004-316753

(51) Int. Cl.
*G03G 15/00* (2006.01)
(52) U.S. Cl. .............................. 399/37; 399/78; 399/88; 399/89
(58) Field of Classification Search .................. 399/37, 399/78, 89, 88, 90
See application file for complete search history.

(56) References Cited

U.S. PATENT DOCUMENTS 6,539,184 B2 * 3/2003 Shimura et al. ............... 399/50

6,564,023 B2 5/2003 Takami et al.

FOREIGN PATENT DOCUMENTS

JP 10-28328 1/1998

\* cited by examiner

*Primary Examiner*—David M Gray
*Assistant Examiner*—Ryan D Walsh
(74) *Attorney, Agent, or Firm*—Fitzpatrick, Cella, Harper & Scinto

(57) ABSTRACT

An image forming apparatus including an AC high voltage power supply, a DC high voltage power supply, and a high voltage power supply apparatus, which outputs an output voltage at an output end by superposing an output of the AC high voltage power supply and an output of the DC high voltage power supply. The high voltage power supply apparatus has a positive peak detector detecting a positive peak of the voltage at an output end, and a negative peak detector detecting a negative peak of the voltage at an output end. An output voltage of at least one of the AC high voltage power supply and the DC high voltage power supply is controlled on the basis of the detection result of at least one of the positive peak detector and the negative peak detector. An output voltage of the AC high voltage power supply is controlled on the basis of the detection result of the positive peak detector, and an output voltage of the DC high voltage power supply is controlled on the basis of the detection result of the negative peak detector.

10 Claims, 7 Drawing Sheets

IMAGE FORMING APPARATUS AND HIGH VOLTAGE POWER THEREOF

This application claims priority from Japanese Patent Application No. 2004-316753, filed Oct. 29, 2004, which is hereby incorporated by reference herein.

BACKGROUND OF THE INVENTION

1. Field of the Invention

The present invention relates to a high voltage power supply apparatus used in an image forming apparatus and the image forming apparatus provided with the high voltage power supply apparatus, and more particularly, to a high voltage power supply apparatus used in an image forming apparatus using an electrophotographic system, and an image forming apparatus provided with the high voltage power supply apparatus and using the electrophotographic system.

2. Related Background Art

As an example of a high voltage power supply apparatus in a conventional image forming apparatus using the electrophotographic system, a configuration of the image forming apparatus, a configuration of the high voltage power supply apparatus in the image forming apparatus and a circuit configuration of a developing high voltage power supply will be explained in order.

FIG. 7 shows a conventional type of an image forming apparatus, and a configuration of a color image forming apparatus of a four drum system.

A recording medium 110 fed by a pickup roller 111 is first detected at its tip position by a registration sensor 112, and then conveyed by conveying roller pairs 113, 114 and a conveying belt 105. Scanner units 100a to 100d successively irradiate a laser beam on photosensitive drums 101a to 101d in accordance with the detection timing of the registration sensor 112. At this time, photosensitive drums 101a to 101d, which are charged by electrostatic charge rollers 104a to 104d, have an electrostatic latent image formed thereon by the laser beam irradiation, and further have a toner image formed thereon by developing devices 102a to 102d and developing sleeves 103a to 103d. Then, the toner image is transferred to the recording medium 110 conveyed on the conveying belt 105 by transfer rollers 106a to 106d. Then, the recording medium 110 is conveyed to a fixing device 107, and outputted after the image is fixed. Here, the English character "a" of each of the reference characters denotes a configuration and unit for a color of cyan, "b" denotes a configuration and unit for a color of magenta, "c" denotes a configuration and unit for a color of yellow, and "d" denotes a configuration and unit for a color of black.

Next, a configuration of a high voltage power supply apparatus in the image forming apparatus shown in FIG. 7 is explained using FIG. 8.

The image forming apparatus comprises four kinds of high voltage power supply apparatuses including electrostatic charge bias high voltage power supply apparatuses 30a to 30d, which generate an electrostatic charge bias voltage, developing bias high voltage power supply apparatuses 31a to 31d, which generate a developing bias voltage, transfer bias high voltage power supply apparatuses 32a to 32d, which generate a transfer bias voltage, and transfer reverse bias high voltage power supply apparatuses 33a to 33d, which generate a transfer reverse bias voltage. The electrostatic charge bias high voltage power supply apparatuses 30a to 30d form a background potential on the surface of the photosensitive drums 101a to 101d, by applying the electrostatic charge bias voltage to the electrostatic charge rollers 104a to 104d, thereby making the surface of the photosensitive drums set to a state that an electrostatic latent image can be formed by irradiation of a laser beam. The developing bias high voltage power supply apparatus 31a to 31d reciprocate the toner between the developing sleeves 103a to 103d and the photosensitive drums 101a to 101d which are separated from the developing sleeves 103a to 103d, respectively, by applying an AC voltage to the developing sleeves 103a to 103d, to thereby make a toner image formed on the electrostatic latent image. The transfer bias high voltage power supply apparatus 32a to 32d transfer the toner image to the recording medium 110, by applying the transfer bias voltage to the transfer rollers 106a to 106d. Further, the transfer reverse bias high voltage power supply apparatuses 33a to 33d return a waste toner on the conveying belt 105 to the photosensitive drums 101a to 101d, by applying the transfer reverse bias voltage to the transfer rollers 106a to 106d at the time of the cleaning operation of the conveying belt 105. Here, the waste toner returned to the photosensitive drums 101a to 101d is scraped off by cleaning blades 115a to 115d, so as to be stored in the waste toner containers 116a to 116d.

Next, an example of a circuit configuration of the developing bias high voltage power supply apparatus 31a in the high voltage power supply apparatus shown in FIG. 8 is explained using FIG. 9.

As disclosed in Japanese Patent Application Laid-Open No. H10-28328, in a DC high voltage power supply 10, an AC voltage generated by a DC driving circuit 12 is stepped up by a transformer 13 to a voltage having an amplitude of several tens of times as large as that of the AC voltage, and then smoothed by a rectifying circuit 14, as a result of which, a DC voltage is outputted between outputs 20, 21. A detection circuit 15 detects the voltage between the outputs 20, 21. A DC control circuit 16 performs control so as to make the voltage between the outputs 20, 21 become a predetermined value determined by a DC control signal 28, on the basis of the detection result of the detection circuit 15. On the other hand, in an AC high voltage power supply 11, an AC pulse signal 29 is amplified by an AC driving circuit 17 and then stepped up by a transformer 18 to a voltage having an amplitude of several tens of times as large as that of the amplified AC pulse signal 29, as a result of which, an AC voltage is outputted between outputs 22, 23. Here, the outputs 20, 21 and the outputs 22, 23 are connected in series, so that a voltage consisting of the output voltage of the DC high voltage power supply 10 superposed on the output voltage of the AC high voltage power supply 11 is outputted to an output end 25.

Further, the adjustment of printing density is performed by changing the output voltage of the DC high voltage power supply 10 by means of the DC control signal 28. At this time, the amplitude of the output voltage of the AC high voltage power supply 11 is kept constant.

However, the above-described conventional circuit configuration has problems that the output voltage of the AC high voltage power supply 11 easily fluctuates during load fluctuation, because the output voltage is not detected and controlled, and because the so-called open control is used, and that it is difficult to achieve the high output voltage precision at the output end because the output voltage precision at the output end is determined by a combination of the precision of the DC high voltage power supply and the precision of the AC high voltage power supply.

SUMMARY OF THE INVENTION

The present invention has been made in view of the above-described problems.

An object of the present invention is to provide a high voltage power supply apparatus, which is capable of performing accurate control of the output voltage, and which is hardly influenced by load fluctuation, and to provide an image forming apparatus provided with the high voltage power supply apparatus.

Another object of the present invention is to provide a high voltage power supply apparatus, which is capable of performing accurate control of the output voltage, and which is hardly influenced by load fluctuation, and to provide an image forming apparatus provided with the high voltage power supply apparatus.

Another object of the invention is to provide a high voltage power supply apparatus, which includes an AC high voltage power supply and a DC high voltage power supply, and which outputs at its output end a voltage consisting of an output voltage of the AC high voltage power supply superposed on an output voltage of the DC high voltage power supply, the high voltage power supply apparatus comprising a positive peak detector detecting a positive peak voltage of the voltage at the output end, and a negative peak detector detecting a negative peak voltage of the voltage at the output end, wherein the output voltages of the AC high voltage power supply and the DC high voltage power supply are controlled on the basis of the detection results of the positive peak detector and the negative peak detector, respectively.

Further objects of the present invention will become apparent from the following description of preferred embodiments with reference to the accompanying drawings.

DESCRIPTION OF THE PREFERRED EMBODIMENTS

In the following, preferred embodiments according to the present invention will be described with reference to the accompanying drawings.

Embodiment 1

Figure 1:
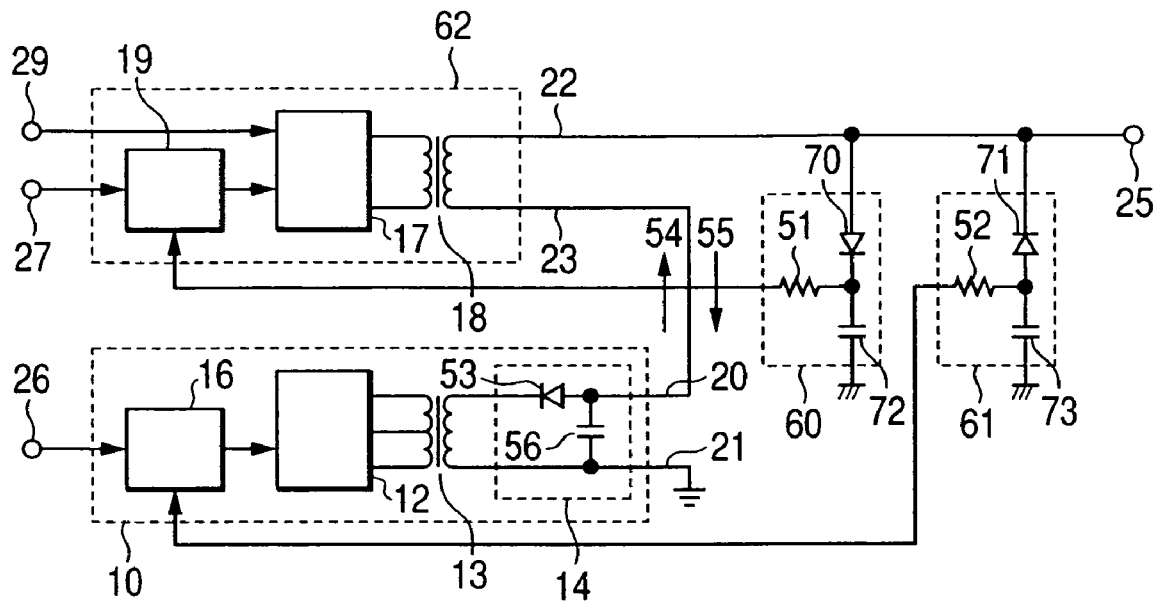
FIG. 1 is a figure showing a configuration of an embodiment 1 of the high voltage power supply apparatus according to the present invention.
Figure 2:
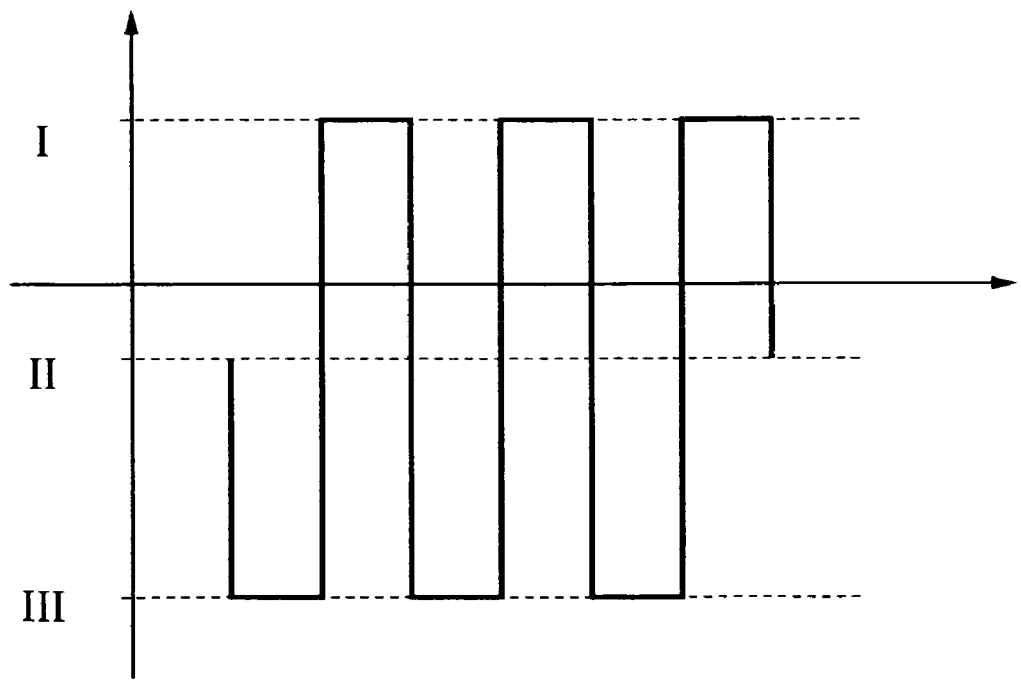
FIG. 2 is a figure showing an operating waveform of the high voltage power supply apparatus of the embodiment 1.
Figure 7:
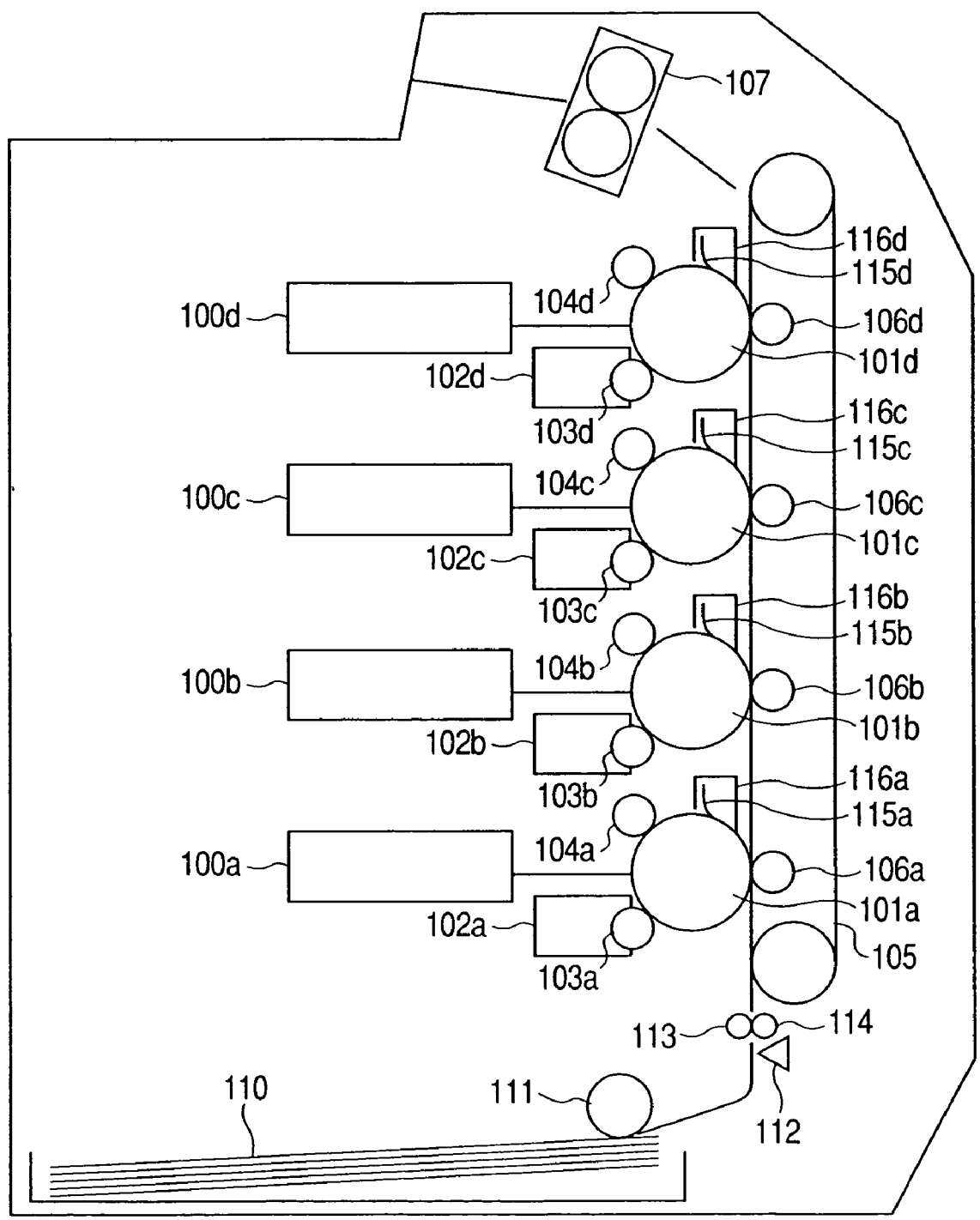
FIG. 7 is a figure showing a configuration of a conventional image forming apparatus.
Figure 8:
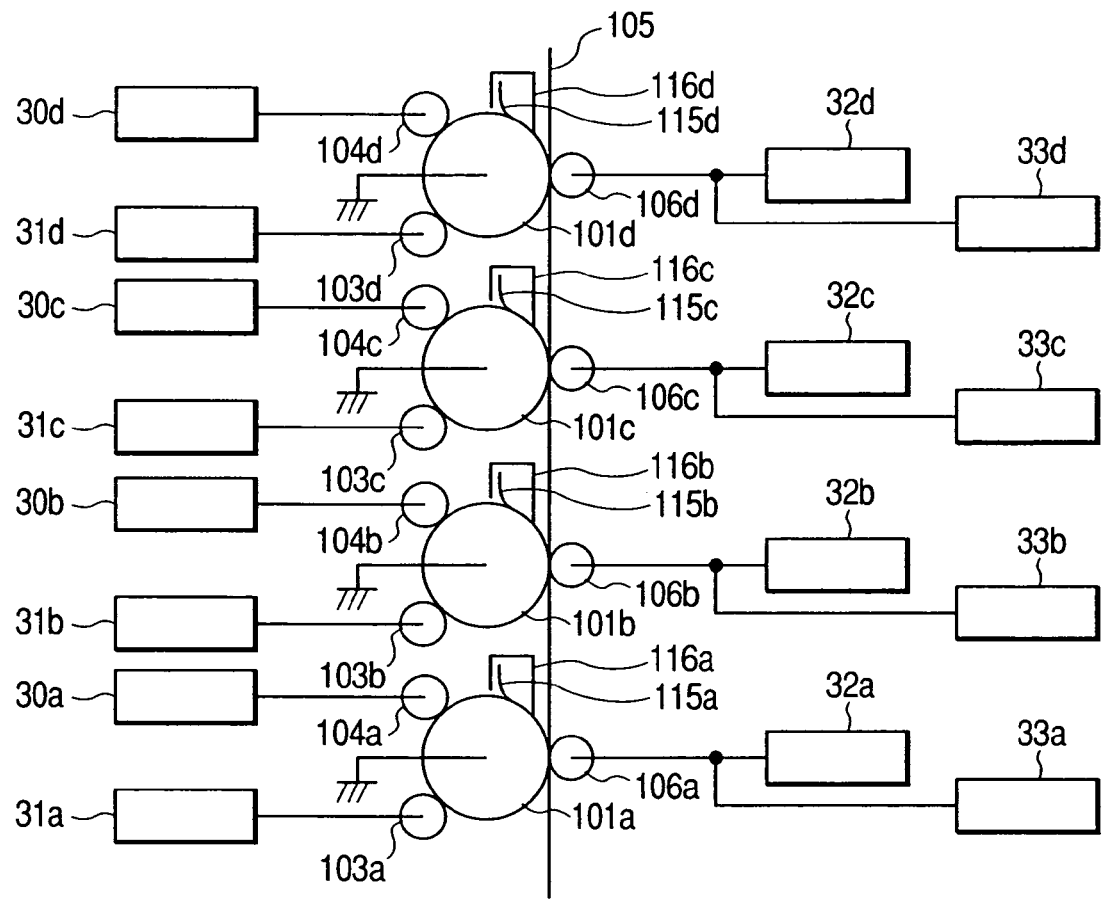
FIG. 8 is a figure showing a configuration of a high voltage power supply apparatus in the conventional image forming apparatus.

FIG. 1 is a figure showing a configuration of a high voltage power supply apparatus of an embodiment 1 according to the present invention, wherein the present invention is applied to a developing bias high voltage power supply apparatus 31a. FIG. 2 is a figure showing an operating waveform of an output end 25 in the circuit shown in FIG. 1. In these figures, components common to the conventional configuration shown in FIG. 7 are denoted by the same reference numerals, and the explanation of the components is omitted. The configuration of the high voltage power supply apparatus of the embodiment 1 according to the present invention is different from the conventional configuration shown in FIG. 7 in that a positive peak detection circuit 60 and a negative peak detection circuit 61, which respectively detect the positive and negative peak voltages at the output end 25, are provided, and in that a DC high voltage power supply 10 and an AC high voltage power supply 62 are arranged to be controlled on the basis of these detection results.

The positive peak detection circuit 60 and the negative peak detection circuit 61 are constituted such that the positive and negative peak voltages are held by diodes 70, 71 and capacitors 72, 73, respectively. A DC control circuit 16 provided for the DC high voltage power supply 10 performs control of a DC voltage between outputs 20, 21 so as to make the negative peak voltage at the output end 25 become a predetermined value determined by a negative peak control signal 26, on the basis of the detection result of the negative peak detection circuit 61. On the other hand, an AC control circuit 19 provided for the AC high voltage power supply 62 performs control of the amplitude of an AC voltage between outputs 22, 23, so as to make the positive peak voltage at the output end 25 become a predetermined value determined by a positive peak control signal 27, on the basis of the detection result of the positive peak detection circuit 60. Similar to the conventional configuration, a voltage consisting of the output voltage of the DC high voltage power supply 10 superposed on the output voltage of the AC high voltage power supply 62 is arranged to be outputted at the output end 25.

That is, referring to the voltage waveform shown in FIG. 2, the DC high voltage power supply 10 detects the negative peak voltage III at the output end 25, and performs control of the DC voltage between the outputs 20, 21, i.e., the mean voltage II of the output at the output end 25, so as to make the negative peak voltage III become a voltage corresponding to the negative peak control signal 26. Further, the AC high voltage power supply 62 detects the positive peak voltage I at the output end 25, and performs control of the amplitude of the AC voltage between the outputs 22, 23, i.e., the voltage amplitude between I and III at the output end 25, so as to make the positive peak voltage I become a voltage corresponding to the positive peak control signal 27.

An attenuation resistor 51 of the positive peak detection circuit 60 and an attenuation resistor 52 of the negative peak detection circuit 61, which resistors serve as a DC load when seen from the output end 25, allow reverse direction currents 54, 55 to flow, when the voltage at the output end 25 reaches the peak voltage. Here, when the current in the direction of arrow 55 is larger than the current in the direction of arrow 54, and thus, the current flows in the direction of arrow 55, the amount of charge of a capacitor 56 provided for a rectifier circuit 14 can be temporarily changed, but the compensation is performed in average through a diode 53, so as to eliminate the influence of the current.

However, when the current in the direction of arrow 54 is larger than the current in the direction of arrow 55, and thus, the current flows in the direction of arrow 54, in the DC high voltage power supply 10, the amount of charge variation of the capacitor 56 cannot be compensated for, and the voltage at the output end 25 changes to be not less than the control voltage, thereby causing an uncontrollable state. On the other hand, when a load resistor, and the like, is provided between the outputs 20, 21, the amount of charge variation of the capacitor 56 can be compensated for. However, in this case, the load resistor serves as a load of the DC high voltage power supply 10, so that there is a possibility of an increase in the cost and calorific value, and the like. Therefore, the present embodiment is constituted such that resistors having the same resistance value are used for the attenuation resistor 51 and the attenuation resistor 52, so as to make the current in the direction of arrow 54 and the current in the direction of arrow 55 substantially equal to each other, whereby the current is prevented from flowing in either of the directions of arrow 54 and arrow 55, in average. However, the attenuation resistor 51 and the attenuation resistor 52 are not necessarily made to be the same with each other. It is possible to stabilize the output voltage of the DC high voltage power supply 10 by making the attenuation resistor 51 have a resistance larger than the attenuation resistor 52, so as to enable the current to flow in the direction of arrow 55, in average.

Further, when the DC high voltage power supply 10 changes the output in order to control the negative peak voltage at the output end 25, it also changes the positive peak voltage. On the contrary, when the AC high voltage power supply 62 changes the output in order to control the positive peak voltage at the output end 25, it also changes the negative peak voltage. For this reason, in the case where the response speed of the DC high voltage power supply 10 is not much different from that of the AC high voltage power supply 62, the control circuits of both of the power supplies perform control of the output voltage at the output end 25 at the same time, as a result of which, it takes much time to stabilize the output voltage. Therefore, in the present embodiment, the response speed of the DC high voltage power supply 10, performing control of the output voltage on the basis of the detection result of the negative peak detection circuit 61, is set to be about twenty times slower than the response speed of the AC high voltage power supply 62 performing control of the output voltage on the basis of the detection result of the positive peak detection circuit 60.

In addition, when the circuit of the present embodiment is started, the negative peak control signal 26 is risen with a slight delay from the rise of the AC pulse signal 29 and the positive peak control signal 27. Thereby, the behavior of the output voltage is stabilized and the overshoot of the waveform can be prevented.

According to the present embodiment, since the positive and negative peak voltages at the output end 25 are directly detected for performing the control, it is possible to constitute the high voltage power supply apparatus, which is capable of performing accurate control of the AD output voltage, reducing the effect of load fluctuation, stabilizing the output voltage in a short period of time, and suppressing the overshoot when the power supply apparatus is started.

Embodiment 2

Figure 3:
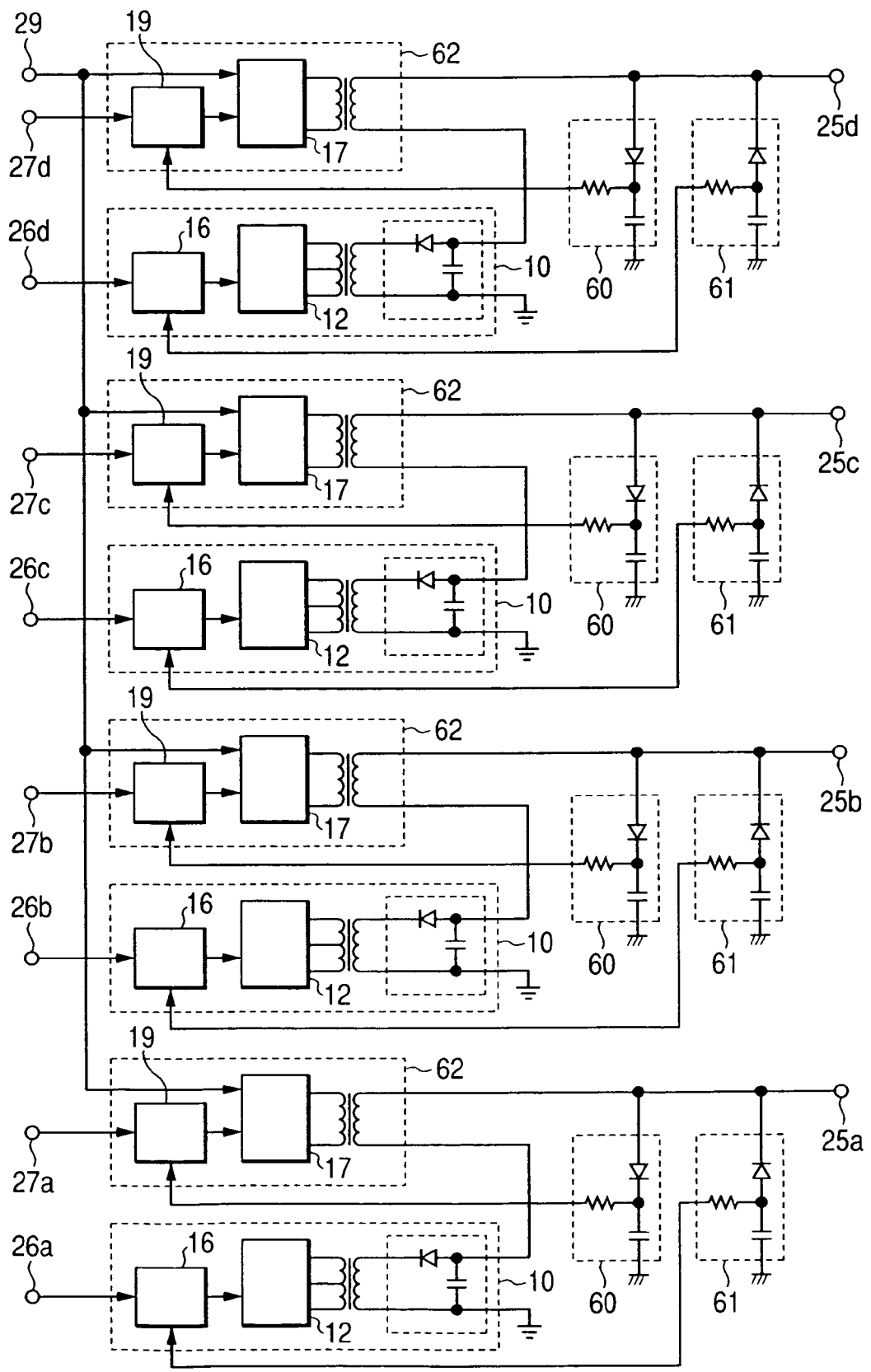
FIG. 3 is a figure showing a configuration of an embodiment 2 of the high voltage power supply apparatus according to the present invention.

FIG. 3 is a figure showing a configuration of an embodiment 2 of the high voltage power supply apparatus according to the present invention, and showing an example of a circuit, in which the present invention is applied to the developing bias high voltage power supply apparatus 31a to 31d, in the output ends 25a to 25d of the color image forming apparatus of a four drum system. In FIG. 3, components common to the embodiment 1 shown in FIG. 1, are denoted by the same reference numerals, and an explanation of the components is omitted. The present embodiment is characterized in that the negative peak control signals 26a to 26d and the positive peak control signals 27a to 27d at the input end, are provided independently for each circuit, and in that the AC pulse signal 29 at the input end is made common to the four circuits.

In the present embodiment, the AC pulse signal 29 is always set in an operation state, and each high voltage output is controlled by setting the negative peak control signals 26a to 26d and the positive peak control signals 27a to 27d. Here, by making the value of the negative peak control signals 26A to 26D increased and decreased together with the value of the positive peak control signals 27A to 27D, it is possible to accurately change the DC voltage of each high voltage output, while the peak-to-peak voltage of each high voltage output is maintained to be constant as in the conventional circuit configuration. Further, it is possible to operate only the developing bias high voltage power supply apparatus 31d of the black station at the time of printing a monochrome image, as in the conventional circuit configuration.

According to the present embodiment, in the image forming apparatus provided with a plurality of developing bias circuits, an operation, which is the same as that of the conventional circuit can be effected, even in the configuration in which the AC pulse signal 29 is made common to the respective developing bias circuits. Further, according to the present embodiment, it is possible to constitute the high voltage power supply circuit, which is capable of independently performing sufficiently accurate control of the output voltage of the respective circuits.

Embodiment 3

Figure 4:
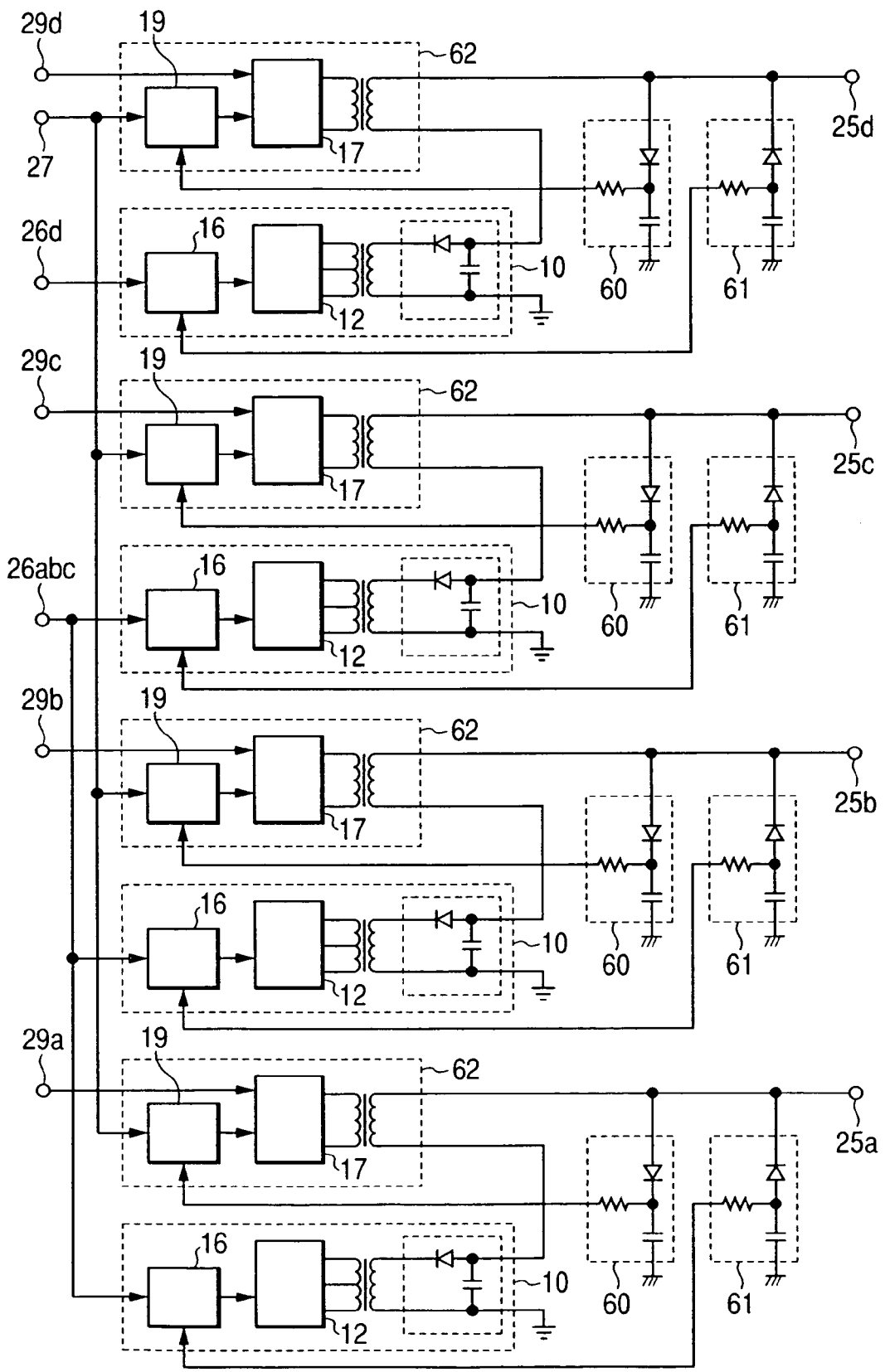
FIG. 4 is a figure showing a configuration of an embodiment 3 of the high voltage power supply apparatus according to the present invention.

FIG. 4 is a figure showing a configuration of an embodiment 3 of the high voltage power supply apparatus according to the present invention, and showing an example of a circuit in which the present invention is applied to the developing bias high voltage power supply apparatus 31a to 31d in the output ends 25a to 25d, as in the embodiment 2. In FIG. 4, components common to the embodiment 2 shown in FIG. 3, are denoted by the same reference numerals, and an explanation of the components is omitted. The present embodiment is different from the embodiment 2 in that the AC pulse signals 29a to 29d at the input end are independently provided for respective circuits, that the positive peak control signal 27 at the input end is made common to the four circuits, and that the negative peak control signal 26abc is commonly inputted into the three color circuits and the negative peak control signal 26d is independently inputted into only the black color circuit.

According to the present embodiment, the AC pulse signals 29a to 29d are independently provided, so that the duty ratio of the output of the AC high voltage power supply 62 can be independently controlled. Further, the provision of the negative peak control signal 26d, for only the black color circuit, makes it possible at the time of printing a monochrome image to stop the generation of the color developing bias voltage by means of the AC pulse signals 29a to 29c and the negative peak control signal 26abc, and to enable the output only of the developing bias high voltage power supply apparatus of black color 31d at the output end 25d. However, the present embodiment is not limited to the configuration in which the negative peak control signal of black color is independently provided.

In the following, the effect of the present embodiment is explained by comparing the developing bias according to the present embodiment with the developing bias using the conventional high voltage circuit.

Figure 9:
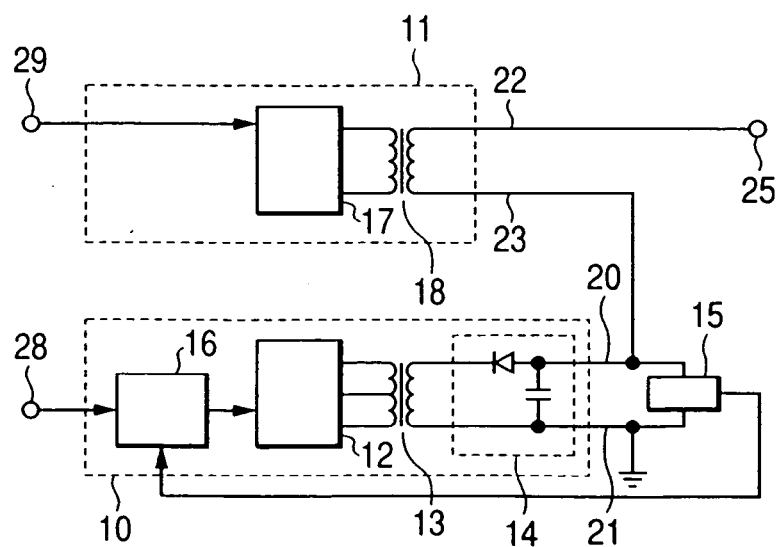
FIG. 9 is a figure showing a configuration of a developing bias circuit in the conventional high voltage power supply apparatus.

Normally, in the case where the same developing bias voltage is used, the output image density is changed in accordance with the image formation operation time and the use environment of the developing device. For this reason, in the conventional configuration, in order to obtain a stable output image density until the end of the life of the developing device, the output voltage of the DC high voltage power supply 10 of the conventional high voltage power supply apparatus shown in FIG. 9 is changed by means of the DC control signal 28, so that the mean value (Vdc) of the output voltage is changed, while the output voltage amplitude of the AC high voltage power supply 11 is maintained to be constant. As a result, the output image density is adjusted by the change of the mean value (Vdc).

Figure 5A:
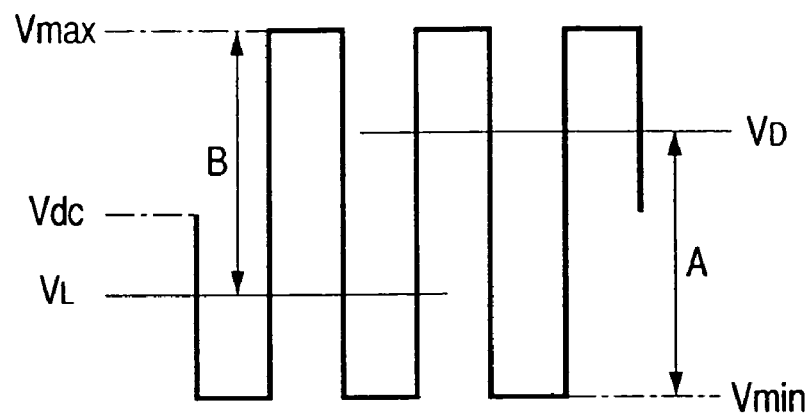
FIG. 5A is a figure showing an operating waveform of the high voltage power supply apparatus of the embodiment 3 in the case of a duty of 50%.
Figure 5B:
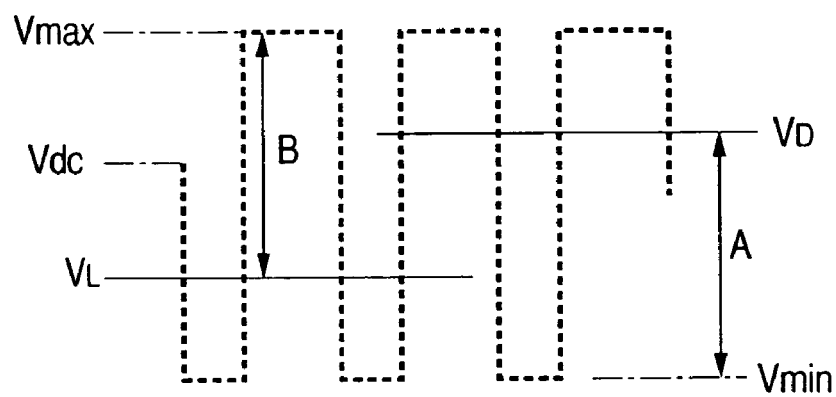
FIG. 5B is a figure showing an operating waveform of the high voltage power supply apparatus of the embodiment 3 in the case of a duty of 70%.
Figure 5C:
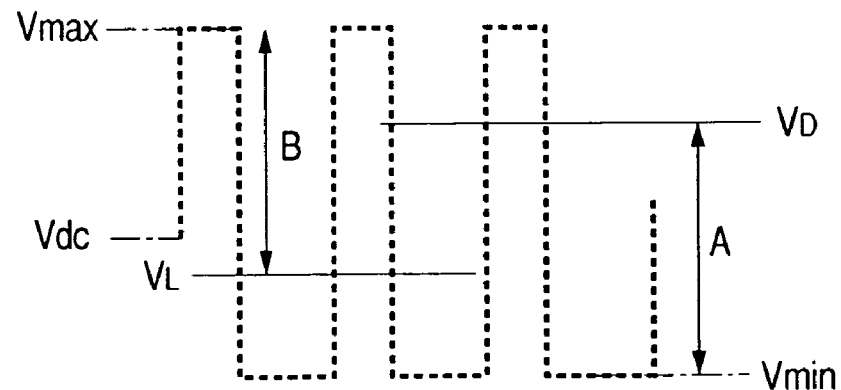
FIG. 5C is a figure showing an operating waveform of the high voltage power supply apparatus of the embodiment 3 in the case of a duty of 30%.
Figure 6A:
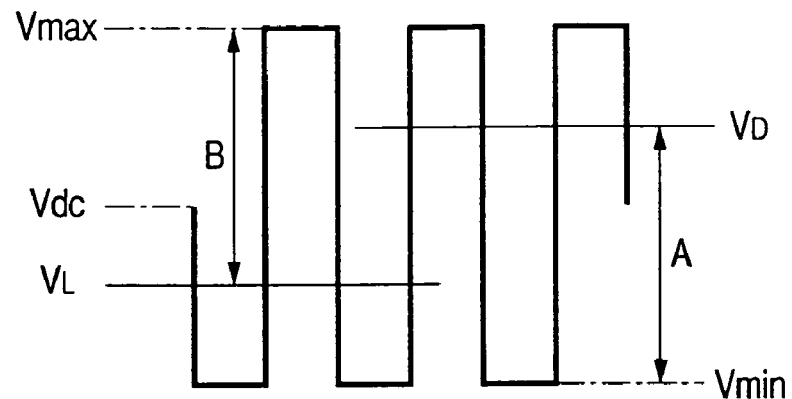
FIG. 6A is a figure showing an operating waveform of a conventional high voltage power supply apparatus when Vdc is controlled to be located in the center of the control range.
Figure 6B:
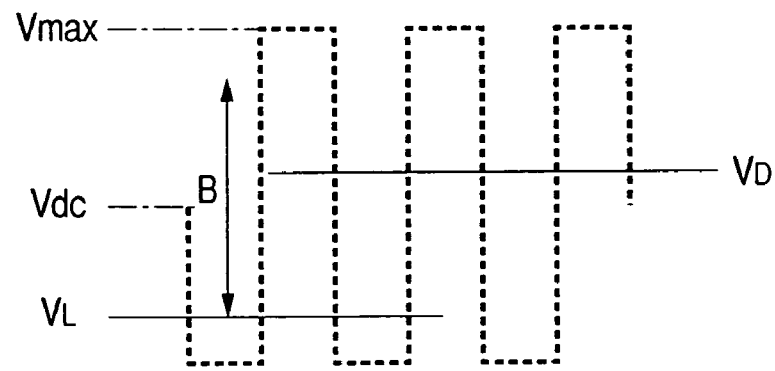
FIG. 6B is a figure showing an operating waveform of the conventional high voltage power supply apparatus when Vdc is controlled at a maximum of the control range.
Figure 6C:
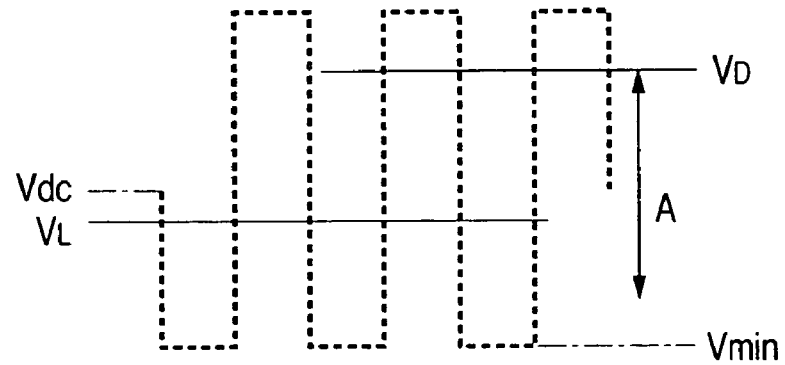
FIG. 6C is a figure showing an operating waveform of a conventional high voltage power supply apparatus when Vdc is controlled at a minimum of the control range.

Here, FIG. 5A to FIG. 5C show bias voltage waveforms at the time of development in the present embodiment. FIG. 6A to FIG. 6C show developing bias waveforms in the prior art form. FIG. 5A is a figure showing a bias voltage waveform of the high voltage power supply apparatus at the time of development in the case of control with a duty of 50%. FIG. 5B is a figure showing a bias voltage waveform of the high voltage power supply apparatus at the time of development in the case of control with a duty of 70%. FIG. 5C is a figure showing a bias voltage waveform of the high voltage power supply apparatus at the time of development in the case of control with a duty of 30%. FIG. 6A is a figure showing a bias voltage waveform of the high voltage power supply apparatus when Vdc is located approximately in the center of the control range. FIG. 6B is a figure showing a bias voltage waveform of the high voltage power supply apparatus in the case of control at a maximum in the control range of Vdc. FIG. 6C is a figure showing a bias voltage waveform of the high voltage power supply apparatus in the case of control at a minimum in the control range of Vdc. Potential differences A, B in the figures show the discharge (leak) potential between the dark potential (VD) of the photosensitive drum and the potential of the developing sleeve, and between the light potential (VL) of the photosensitive drum and the potential of the developing sleeve, respectively. In these figures, the potential is positive in the downward direction.

In the developing bias using the conventional circuit shown in FIG. 9, the maximum voltage (Vmax) and also the minimum voltage (Vmin) change with the density adjustment, which directly controls the Vdc, as shown in FIG. 6A to FIG. 6C. At this time, the potential difference between the VD and the potential of the developing sleeve or the potential difference between the VL and the potential of the developing sleeve may exceed the leak potentials A, B. For this reason, even when the Vdc is changed as much as possible within the density adjustment range, it is necessary to use the AC amplitude, which prevents the Vmax and Vmin from exceeding the leak potential.

On the other hand, in the present embodiment, the Vdc, which is the mean value of the AC voltage amplitude, can be indirectly changed by changing the duty ratio of the developing bias, while the Vmax and Vmin are maintained to be constant, as shown in FIG. 5A to FIG. 5C, whereby it is possible to use the developing bias voltage having a maximum AC voltage amplitude, which does not exceed the above-described leak potential.

That is, the AC voltage amplitude of the developing bias according to the present embodiment, can be made larger than the AC voltage amplitude of the developing bias using the conventional high voltage circuit. As a result, it is possible to obtain an output image, which is excellent in dot reproducibility and image uniformity of character images.

What is claimed is:

1. An image forming apparatus comprising:
an AC high voltage power supply;
a DC high voltage power supply; and
a high voltage power supply apparatus, which outputs an output voltage at an output end by superposing an output of said AC high voltage power supply and an output of said DC high voltage power supply, said high voltage power supply apparatus including a positive peak detector detecting a positive peak of the voltage at an output end, and a negative peak detector detecting a negative peak of the voltage at an output end,
wherein an output voltage of at least one of said AC high voltage power supply and said DC high voltage power supply is controlled on the basis of the detection result of at least one of the positive peak detector and the negative peak detector, and
wherein an output voltage of said AC high voltage power supply is controlled on the basis of the detection result of said positive peak detector, and an output voltage of said DC high voltage power supply is controlled on the basis of the detection result of said negative peak detector.

2. An image forming apparatus comprising:
an AC high voltage power supply;
a DC high voltage power supply; and
a high voltage power supply apparatus, which outputs an output voltage at an output end by superposing an output of said AC high voltage power supply and an output of said DC high voltage power supply, said high voltage power supply apparatus including a positive peak detector detecting a positive peak of the voltage at an output end, and a negative peak detector detecting a negative peak voltage of the voltage at an output end,
wherein an output voltage of at least one of said AC high voltage power supply and said DC high voltage power supply is controlled on the basis of the detection result of at least one of the positive peak detector and the negative peak detector, and
wherein said positive peak detector and said negative peak detector respectively include a DC load, said DC high voltage power supply outputs a voltage of a negative polarity, and the DC load of said positive peak detector has a resistance value of not less than the DC load of said negative peak detector.

3. An image forming apparatus comprising:
an AC high voltage power supply;
a DC high voltage power supply; and
a high voltage power supply apparatus, which outputs an output voltage at an output end by superposing an output of said AC high voltage power supply and an output of said DC high voltage power supply, said high voltage power supply apparatus including a positive peak detector detecting a positive peak of the voltage at an output end, and a negative peak detector detecting a negative peak voltage of the voltage at an output end, wherein an output voltage of at least one of said AC high voltage power supply and said DC high voltage power supply is controlled on the basis of the detection result of at least one of the positive peak detector and the negative peak detector, and wherein, with respect to the detection results of said positive peak detector and said negative peak detector, response speeds of control performed by said AC high voltage power supply and said DC high voltage power supply are different by at least two times from each other.

4. An image forming apparatus comprising:
an AC high voltage power supply;
a DC high voltage power supply; and
a high voltage power supply apparatus, which outputs an output voltage at an output end by superposing an output of said AC high voltage power supply and an output of said DC high voltage power supply, said high voltage power supply apparatus including a positive peak detector detecting a positive peak of the voltage at an output end, and a negative peak detector detecting a negative peak voltage of the voltage at an output end; and
a positive peak control signal input part and a negative peak control signal input part, wherein the positive peak voltage and the negative peak voltage of the output voltage at an output end is variably controlled in accordance with a positive peak control signal and a negative peak control signal, which are inputted from the positive peak a control signal input part and the negative peak control signal input part,
wherein an output voltage of at least one of said AC high voltage power supply and said DC high voltage power supply is controlled on the basis of the detection result of at least one of the positive peak detector and the negative peak detector, and
wherein, in case a positive peak value and negative peak value of said output voltage are changed, a change timing of said positive peak control signal and a change timing of said negative peak control signal are different.

5. An image forming apparatus comprising:
an AC high voltage power supply;
a DC high voltage power supply; and
a high voltage power supply apparatus, which outputs an output voltage at an output end by superposing an output of said AC high voltage power supply and an output of said DC high voltage power supply, said high voltage power supply apparatus including a positive peak detector detecting a positive peak of the voltage at an output end, and a negative peak detector detecting a negative peak voltage of the voltage at an output end,
wherein an output voltage of at least one of said AC high voltage power supply and said DC high voltage power supply is controlled on the basis of the detection result of at least one of the positive peak detector and the negative peak detector, and
wherein an output duty of said AC high voltage power supply is variable.

6. A high voltage power supply apparatus having an AC high voltage power supply and a DC high voltage power supply, wherein the high voltage power supply apparatus outputs a voltage at an output end of a voltage of an output voltage of the AC high voltage power supply superposed on an output voltage of the DC high voltage power supply, said high voltage power supply apparatus comprising:
a positive peak detector detecting a positive peak voltage of the voltage at the output end; and
a negative peak detector detecting a negative peak voltage of the voltage at the output end,
wherein at least one of the output voltages of the AC high voltage power supply and the DC high voltage power supply is controlled on the basis of at least one of the detection results of said positive peak detector and said negative peak detector, and
wherein the output voltage of the AC high voltage power supply is controlled on the basis of the detection result of said positive peak detector, and wherein the output voltage of the DC high voltage power supply is controlled on the basis of the detection result of said negative peak detector.

7. A high voltage power supply apparatus having an AC high voltage power supply and a DC high voltage power supply, wherein the high voltage power supply apparatus outputs a voltage at an output end of a voltage of an output voltage of the AC high voltage power supply superposed on an output voltage of the DC high voltage power supply, said high voltage power supply apparatus comprising:
a positive peak detector detecting a positive peak voltage of the voltage at the output end; and
a negative peak detector detecting a negative peak voltage of the voltage at the output end,
wherein at least one of the output voltages of the AC high voltage power supply and the DC high voltage power supply is controlled on the basis of at least one of the detection results of said positive peak detector and said negative peak detector, and
wherein said positive peak detector and said negative peak detector respectively include a DC load, wherein the DC high voltage power supply outputs a voltage of negative polarity, and wherein the DC load of said positive peak detector has a resistance value not less than the DC load of said negative peak detector.

8. A high voltage power supply apparatus having an AC high voltage power supply and a DC high voltage power supply, wherein the high voltage power supply apparatus outputs a voltage at an output end of a voltage of an output voltage of the AC high voltage power supply superposed on an output voltage of said DC high voltage power supply, said high voltage power supply apparatus comprising:
a positive peak detector detecting a positive peak voltage of the voltage at the output end; and
a negative peak detector detecting a negative peak voltage of the voltage at the output end,
wherein at least one of the output voltages of the AC high voltage power supply and the DC high voltage power supply is controlled on the basis of at least one of the detection results of said positive peak detector and said negative peak detector, and
wherein response speeds of control performed by the AC high voltage power supply and the DC high voltage power supply with respect to the detection results of said positive peak detector and said negative peak detector are difference by at least two times from each other.

9. A high voltage power supply apparatus having an AC high voltage power supply and a DC high voltage power supply, wherein the high voltage power supply apparatus outputs a voltage at an output end of a voltage of an output voltage of the AC high voltage power supply superposed on an output voltage of the DC high voltage power supply, said high voltage power supply apparatus comprising:
a positive peak detector detecting a positive peak voltage of the voltage at the output end;
a negative peak detector detecting a negative peak voltage of the voltage at the output end; and a positive peak control signal input part and a negative peak control signal input part, wherein the positive peak voltage and the negative peak voltage of the output voltage are variably controlled in accordance with a positive peak control signal and a negative peak control signal, which are inputted from the positive peak control signal input and the negative peak control signal input, wherein at least one of the output voltages of the AC high voltage power supply and the DC high voltage power supply is controlled on the basis of at least one of the detection results of said positive peak detector and said negative peak detector, and wherein when a positive peak value and a negative peak value of the output voltage are changed, a change timing of one of the positive peak control signal and the negative peak control signal is made different from the time when the positive peak value and the negative peak value of the output voltage are changed.

10. A high voltage power supply apparatus having an AC high voltage power supply and a DC high voltage power supply, wherein the high voltage power supply apparatus outputs a voltage at an output end of a voltage of an output voltage of the AC high voltage power supply superposed on an output voltage of the DC high voltage power supply, said high voltage power supply apparatus comprising:

a positive peak detector detecting a positive peak voltage of the voltage at the output end; and a negative peak detector detecting a negative peak voltage of the voltage at the output end, wherein at least one of the output voltages of the AC high voltage power supply and the DC high voltage power supply is controlled on the basis of at least one of the detection results of said positive peak detector and said negative peak detector, and wherein an output duty of said AC high voltage power supply is variable.

* * * * *